US012679337B2

(12) United States Patent
    Ga et al.

(10) Patent No.: US 12,679,337 B2
(45) Date of Patent: Jul. 14, 2026

(54) VEHICLE STABILITY CONTROL DEVICE AND CONTROL METHOD

(71) Applicants: Hyundai Motor Company, Seoul (KR); Kia Corporation, Seoul (KR)

(72) Inventors: Han Seon Ga, Gwangmyeong-si (KR); Jin Seok Song, Bucheon-si (KR); Sang Wook Han, Seoul (KR); So Ra Jang, Gwacheon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 163 days.

(21) Appl. No.: 18/604,964

(22) Filed: Mar. 14, 2024

(65) Prior Publication Data

US 2025/0178590 A1     Jun. 5, 2025

(30) Foreign Application Priority Data

Dec. 4, 2023     (KR) ........................ 10-2023-0173724

(51) Int. Cl.
    B60W 30/02     (2012.01)
    B60W 40/114     (2012.01)
(52) U.S. Cl.
    CPC .......... B60W 30/02 (2013.01); B60W 40/114 (2013.01); B60W 2520/14 (2013.01)
(58) Field of Classification Search
    CPC .............. B60W 30/02; B60W 40/114; B60W 2520/14; B60W 50/082; B60W 2520/26; B60W 2540/215; B60W 2720/14; B60W 10/04; B60W 10/18; B60W 30/18172; B60W 2520/28; B60T 8/1755; B60Y 2300/02
    See application file for complete search history.

(56) References Cited

U.S. PATENT DOCUMENTS

| | | | |
|---|---|---|---|
| 11,247,561 B2 | 2/2022 | Gully | |
| 2009/0030561 A1 | 1/2009 | Gurieff et al. | |
| 2019/0168745 A1 | 6/2019 | Hashimoto | |
| 2021/0039630 A1 | 2/2021 | Oh et al. | |
| 2021/0171017 A1* | 6/2021 | Oh ...................... | B60W 40/068 |

FOREIGN PATENT DOCUMENTS

| | | |
|---|---|---|
| KR | 20190101314 A | 8/2019 |
| WO | 2006099662 A1 | 9/2006 |

* cited by examiner

*Primary Examiner* — Long T Tran
*Assistant Examiner* — Charles J Brauch
(74) *Attorney, Agent, or Firm* — Slater Matsil, LLP

(57) ABSTRACT

In embodiments, a vehicle stability control device includes an input unit that receives a stability control level, a receiving unit that receives driving information, and a stability control unit configured to control a driving force and a braking force based on the stability control level received by the input unit and the driving information received by the receiving unit.

20 Claims, 6 Drawing Sheets

VEHICLE STABILITY CONTROL DEVICE AND CONTROL METHOD

CROSS-REFERENCE TO RELATED APPLICATIONS

This application claims the benefit of Korean Patent Application No. 10-2023-0173724, filed on Dec. 4, 2023, which application is hereby incorporated herein by reference in its entirety.

TECHNICAL FIELD

The present disclosure relates to a vehicle stability control device and control method.

BACKGROUND

Electronic Stability Control (ESC) provided in a vehicle may prevent the vehicle from slipping and improve driving stability of the vehicle, and is currently applied to most vehicles for safety reasons.

Generally, when Electronic Stability Control (ESC) detects excessive wheel slip of a vehicle, the wheel slip may be alleviated by reducing an output of a wheel with excessive wheel slip, and a direction of the vehicle may also be controlled by controlling braking of the wheel with excessive wheel slip.

For example, when a vehicle makes a sharp turn, a wheel inside a turning radius may slip, causing the vehicle to be pushed to the outside of the turning radius. In this case, electronic stability control may prevent the vehicle from slipping by controlling braking of the wheel inside the turning radius.

Meanwhile, there may be a problem in which the driver could not completely turn off stability control or adjust an amount of stability control even in certain situations (for example, when driving on a track).

SUMMARY

The present disclosure provides a vehicle stability control device and control method that can adjust a control amount related to stability control of a vehicle.

According to an aspect of the present disclosure, a vehicle stability control device, may include an input unit receiving a stability control level, a receiving unit receiving vehicle driving information, and a stability control unit controlling driving force and braking force based on the stability control level and the driving information.

The driving information may include yaw rate information and the stability control unit may control braking force based on the yaw rate information.

When the yaw rate information exceeds a preset target yaw rate, the stability control unit may control braking force.

The target yaw rate may be set to be greater as the stability control level increases.

The stability control unit may adjust a degree of braking force according to a size of a yaw error and the yaw error may be determined by a difference between the yaw rate information and a preset target yaw rate.

The stability control unit may set the degree of the braking force according to the size of the yaw error to be greater as the stability control level increases.

The driving information may include wheel slip information and the stability control unit may control driving force based on the wheel slip information.

When the wheel slip information exceeds a preset target wheel slip, the stability control unit may control driving force.

The target wheel slip may be set to be smaller as the stability control level increases.

The stability control unit may adjust driving force according to a difference between the wheel slip information and a preset target wheel slip.

The stability control unit may set the driving force to be greater according to the difference between the wheel slip information and a preset target wheel slip as the stability control level increases.

According to another aspect of the present disclosure, a vehicle stability control method, may include receiving a stability control initiation signal, receiving stability control setting information and driving information, and performing stability control. The operation of performing the stability control, driving force and braking force may be controlled based on the driving information. The control of the driving force and the braking force may be adjusted according to the stability control setting information.

The stability control setting information may include stability control level information and the driving information may include yaw rate information and wheel slip information. In the operation of performing the stability control, at least one of driving force and the braking force may be controlled using at least one of the yaw rate information and the wheel slip information.

When the yaw rate information exceeds a preset target yaw rate, in the operation of performing the stability control, braking force may be controlled.

The target yaw rate may be set to be higher as the stability control level increases.

In the operation of performing the stability control, a degree of the braking force may be adjusted according to a size of a yaw error, and the yaw error may be determined by a difference between the yaw rate information and a preset target yaw rate.

In the operation of performing the stability control, a degree of the braking force according to a size of a yaw error may be set to be greater as the stability control level increases, and the yaw error may be determined by a difference between the yaw rate information and a preset target yaw rate.

When the wheel slip information exceeds a preset target wheel slip, in the operation of performing the stability control, the target wheel slip may be set to be smaller as the stability control level increases.

In the operation of performing the stability control, a degree of the driving force may be adjusted according to a difference between the wheel slip information and a preset target wheel slip.

In the operation of performing the stability control, a degree of the driving force may be set to be greater according to the difference between the wheel slip information and a preset target wheel slip as the stability control level increases.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION OF ILLUSTRATIVE EMBODIMENTS

Figure 1:
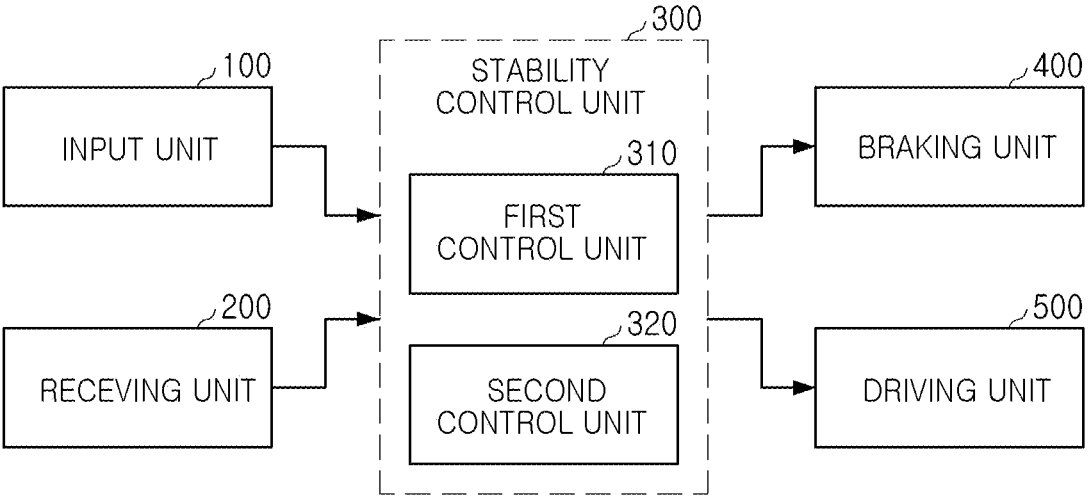
FIG. 1 is a block diagram of a vehicle stability control device according to an embodiment of the present disclosure.

Hereinafter, the present disclosure will be described in detail with reference to the accompanying drawings. In adding reference numerals to elements of each of the drawings, although the same elements are illustrated in other drawings, like reference numerals may refer to like elements. Since the present disclosure can make various changes and have various embodiments, specific embodiments are illustrated in the drawings and described in detail. However, this is not intended to limit the present disclosure to specific embodiments, and should be understood to include all modifications, equivalents, and substitutes included in the spirit and scope of the present disclosure.

Terms such as "first," "second" and the like, may be used to describe various components, but the components should not be limited by the terms. These terms are only used for the purpose of distinguishing one component from another component. For example, a first element may be termed a second element, and similarly, a second element may be termed a first element, without departing from the scope of the present disclosure. The term 'and/or' includes a combination of a plurality of related recited items or any one of a plurality of related recited items.

Terms used in this application are only used to describe specific embodiments, and are not intended to limit the present disclosure. Singular expressions include plural expressions unless the context thereof is clearly dictated otherwise. In this application, terms such as "comprise" or "having" are intended to designate that there is a feature, number, step, operation, component, part, or combination thereof described in the specification, but one or more other features It should be understood that it does not preclude the possibility of the presence or addition of numbers, steps, operations, components, parts, or combinations thereof.

Unless defined otherwise, all terms used herein, including technical or scientific terms, have the same meaning as commonly understood by one of ordinary skill in the art to which the present disclosure belongs. Terms such as those defined in commonly used dictionaries should be interpreted as having a meaning consistent with the meaning in the context of the related art, and unless explicitly defined in this application, they should not be interpreted in an ideal or excessively formal meaning.

Hereinafter, with reference to the accompanying drawings, preferred embodiments of the present disclosure will be described in more detail.

FIG. 1 is a block diagram of an EMB emergency braking device and an emergency braking method according to an embodiment of the present disclosure.

The vehicle stability control device according to an embodiment of the present disclosure may include an input unit 100, a receiving unit 200, and a stability control unit 300 including a first control unit 310 and a second control unit 320. As discussed below, the figure also shows a braking unit 400 and a driving unit 500.

The input unit 100 may receive information regarding whether to use the vehicle stability control device selected by a driver or information on a vehicle stability control level.

The input unit 100 may be a display capable of touch recognition (e.g., Audio, Video, Navigation (AVN)) included in a cluster of a vehicle, and the input unit 100 may receive information regarding the vehicle stability control level desired by a user through a driver's touch.

Figure 2:
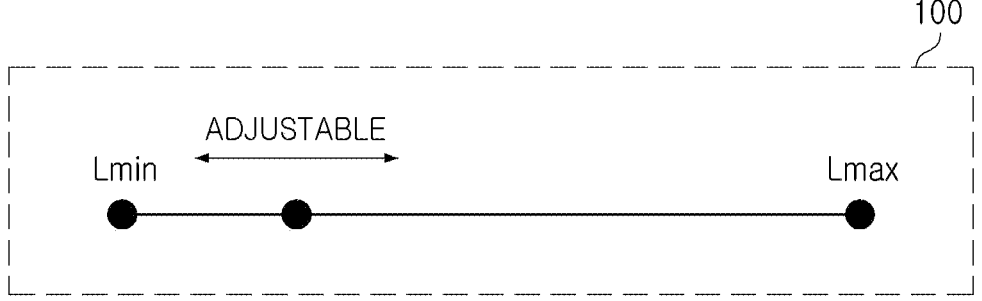
FIG. 2 is a diagram illustrating an input unit including a display according to an embodiment of the present disclosure.

FIG. 2 is a diagram illustrating an input unit 100 including a display according to an embodiment of the present disclosure.

Referring to FIG. 2, the input unit 100 may receive information regarding the vehicle stability control level desired by the driver through the display.

For example, the driver may select the vehicle stability control level by moving left and right through a touch between diagrams drawn from a maximum level (Lmax) of the display to a minimum level (Lmin).

Here, when the minimum level (Lmin) is set to not perform vehicle stability control, information regarding whether or not the vehicle stability control is used is not separately input, and information regarding whether or not the vehicle stability control is used and the vehicle stability control level may be received using a signal input device.

Alternatively, a driver may operate the input unit 100 to adjust a range between the maximum level (Lmax) and the minimum level (Lmin) by a preset size.

For example, the driver may input a desired vehicle stability control level by adding or subtracting the same by a preset amount (for example, 5 or 10) using plus and minus input buttons displayed on the input unit 100.

In addition, the input unit 100 may receive information regarding the vehicle stability control level using voice. The input unit 100 includes audio and a microphone provided in the vehicle, and may receive information regarding the vehicle stability control level by recognizing the driver's voice.

In addition, the input unit 100 may receive information regarding the vehicle stability control level using a pedal shift function. In this case, there may be an advantage in that the driver may easily adjust information regarding the vehicle stability control level even while driving.

The input unit 100 may not be limited to the display, audio, and microphone described above as long as it is a mechanism for receiving information regarding the vehicle stability control level. For example, the input unit 100 may include a mechanism for communicating with a mobile terminal, and receiving information regarding the vehicle stability control level selected by the driver through an application (e.g., Blue Link application) stored in the driver's mobile terminal.

Referring again to FIG. 1, the receiving unit 200 may receive information regarding a driving state of the vehicle.

For example, the receiving unit 200 may receive information regarding the driving state including wheel slip information, steering angle, yaw rate, and the like.

However, the present disclosure is not limited thereto, and the receiving unit 200 may also receive driving information capable of estimating wheel slip information, steering angle, and yaw rate.

For example, the receiving unit 200 may receive information regarding wheel speed, obtain wheel slip information based on a difference between the received wheel speeds, or obtain wheel slip information based on a difference between the wheel speed and the vehicle's driving speed.

The receiving unit 200 may be connected to sensors provided in the vehicle using a network provided in the vehicle and can receive information regarding the driving state of the vehicle.

For example, the receiving unit 200 may receive steering angle information from a steering angle sensor using a vehicle's controller area network (CAN) network.

The stability control unit 300 may control a braking unit 400 or a driving unit 500 based on the vehicle stability control information received from the input unit 100 and the driving information received from the receiving unit 200.

Here, the braking unit 400 may be a device generating braking force to slow down or stop the vehicle.

In addition, the braking unit 400 may generate braking torque to each wheel. The braking unit 400 may be a hydraulic wheel brake which operates using hydraulic pressure, or may be an electro-electronic wheel brake (e.g., electro mechanical brake (EMB)) that operates using electrical energy.

Here, the driving unit 500 may be a device capable of generating driving force that allows the vehicle to be driven. At least two driving units 500 may be provided, and the driving unit 500 may generate driving force of front wheels and driving force of rear wheels differently.

In addition, the driving unit 500 may include a first driving unit that generates driving force to the front wheels and a second driving unit (not separately shown) that generates driving force to the rear wheels. However, the present disclosure is not limited thereto, and the first driving unit 500 may generate driving force to the rear wheels, and the second driving unit 500 may generate driving force to the front wheels.

In addition, the first driving unit 500 and the second driving unit 500 may include at least one electric motor or engine to individually generate driving force to the front and rear wheels.

In addition, the first driving unit 500 and the second driving unit 500 may be variously combined to generate driving force to the vehicle. For example, the first driving unit 500 and the second driving unit 500 may both comprise an electric motor or may both comprise an engine. Alternatively, one of the first driving unit 500 and the second driving unit 500 may comprise an electric motor, and the other driving unit 500 may comprise an engine.

In addition, the first driving unit 500 and the second driving unit 500 may be in-wheel motors that are mounted on individual wheels and generate driving force, but the present disclosure is not limited thereto, and various mechanisms that can generate the driving force of the vehicle may be applied to the driving unit 500.

The stability control unit 300 may include a first control unit 310 and a second control unit 320.

Here, the first control unit 310 may control the braking unit 400, to control a yaw rate of the vehicle.

More specifically, the first control unit 310 may determine whether to enter yaw rate control and a yaw rate control amount.

The second control unit 320 can control wheel slip of a vehicle.

More specifically, the second control unit 320 can determine whether to enter wheel slip control and a wheel slip control amount.

Components of a vehicle stability control device can be connected by wire and wirelessly to exchange information.

For example, the components of the vehicle stability control device may exchange information using a communication protocol such as Ethernet, Media Oriented Systems Transport (MOST), Flexray, Controller Area Network (CAN), Local Interconnect Network (LIN), Internet, LTE, 5G, Wi-Fi, Bluetooth, Near Field communication, Zigbee, Radio frequency, and the like.

Figure 3:
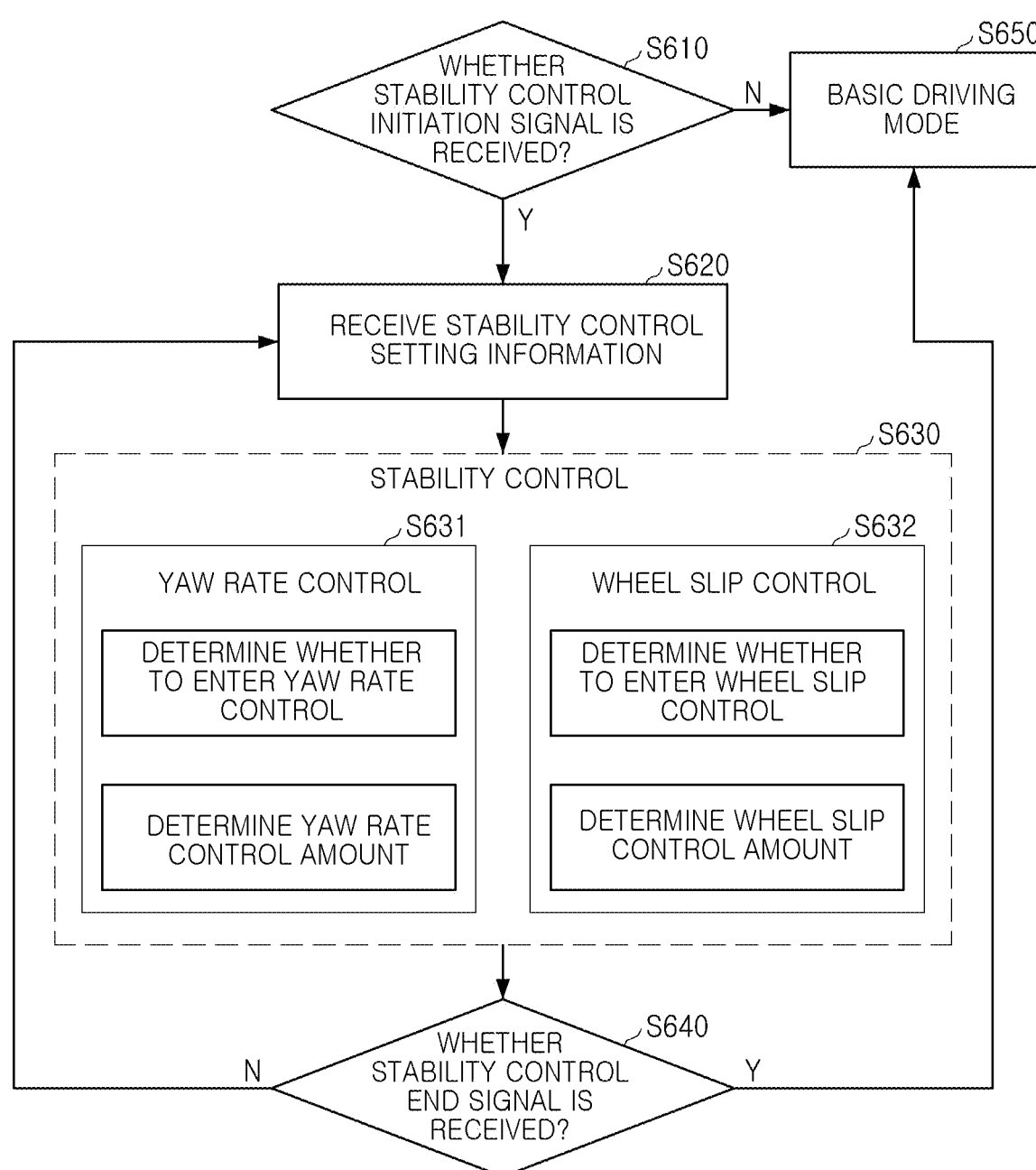
FIG. 3 is a flowchart of a vehicle stability control method according to an embodiment of the present disclosure.

FIG. 3 is a flowchart of a vehicle stability control method according to an embodiment of the present disclosure.

Referring to FIG. 3, a stability control unit 300 may determine whether a stability control initiation signal for a vehicle selected by a driver is received (S610).

When the stability control initiation signal for a vehicle is not received, the vehicle may be driven in a basic driving mode set for the vehicle without control of the stability control unit 300 (S650).

Meanwhile, when the stability control initiation signal for a vehicle is received, the stability control unit 300 may receive stability control setting information input by the driver through an input unit 100 (S620).

The stability control unit 300 may perform stability control by adjusting a driving unit 500 and a braking unit 400 based on the received stability control setting information input by the driver through the input unit 100 (S630).

The stability control unit 300 may perform yaw rate control (S631) and slip control (S632).

A first control unit 310 of the stability control unit 300 may perform yaw rate control (S631).

The first control unit 310 may determine whether to enter yaw rate control, and determine a yaw rate control amount.

Figure 4:
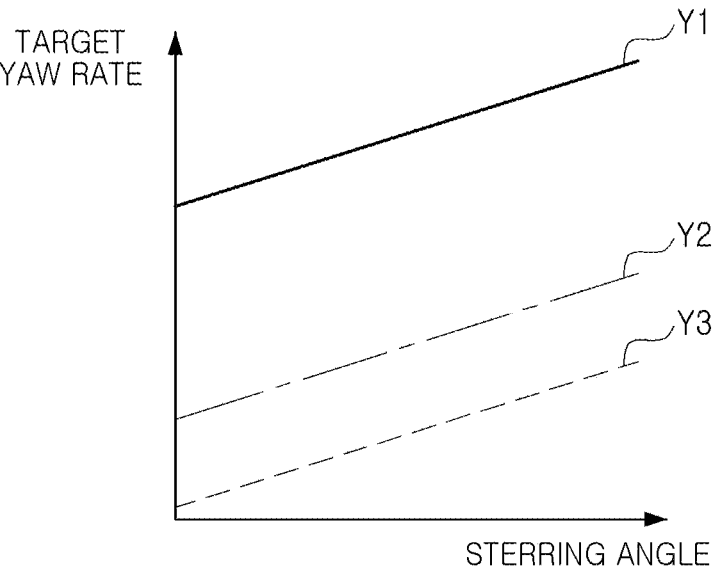
FIG. 4 is a diagram illustrating a target yaw rate according to a steering angle according to an embodiment of the present disclosure.
Figures 5A, 5B:
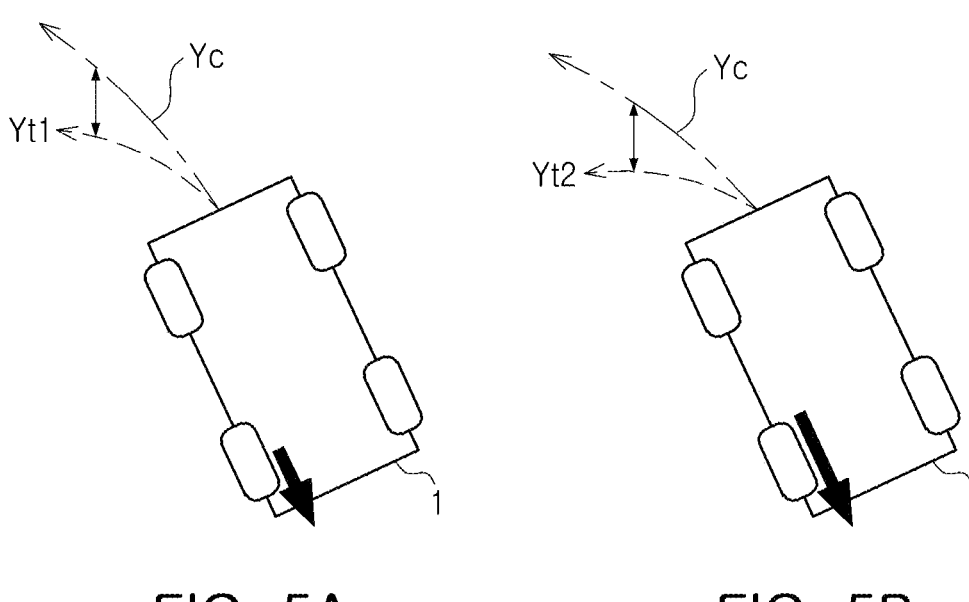
FIGS. 5A and 5B are a diagram illustrating a difference in yaw rate control according to an embodiment of the present disclosure.

FIG. 4 is a diagram illustrating a target yaw rate according to a steering angle according to an embodiment of the present invention. FIGS. 5A and 5B are diagrams illustrating a difference in yaw rate control according to an embodiment of the present disclosure.

Yaw rate control may be control of controlling vehicle stability by controlling a braking unit 400 when under steer or over steer occurs in the vehicle.

Referring to FIG. 4, the first control unit 310 may set a target yaw rate differently based on stability control setting information.

For example, Y1 may be a diagram regarding a target yaw rate when a stability control level is a maximum level (Lmax), Y3 may be a diagram regarding the target yaw rate when the stability control level is a minimum level (Lmin), and Y2 may be a diagram regarding the target yaw rate when the stability control level is between the maximum level (Lmax) and the minimum level (Lmin).

Here, a control intervention time of the first control unit 310 may be adjusted as the target yaw rate is adjusted according to the stability control level.

For example, the first control unit 310 may determine whether to initiate yaw rate control based on a value obtained by subtracting a target yaw rate value from a current yaw rate received from the receiving unit 200.

When the target yaw rate value at the current yaw rate exceeds a preset value, the first control unit 310 may initiate yaw rate control so that the current yaw rate follows the target yaw rate value.

When the target yaw rate is set to be high, such as Y1, the current yaw rate may have a large difference from the target yaw rate, and as the target yaw rate value quickly deviates from the current yaw rate and the preset value, yaw rate control can be quickly intervened.

On the other hand, when the target yaw rate is set to be low, such as Y3, a difference between the current yaw rate and the target yaw rate may be relatively small, and a speed at which the target yaw rate value deviates from a preset value at the current yaw rate may be relatively later than in the case of Y1, and yaw rate control may be intervened relatively late.

The first control unit 310 may adjust a yaw rate control entry point by setting the target yaw rate differently based on stability control setting information.

In addition, the first control unit 310 may adjust an adjustment amount of the braking unit 400 based on stability control setting information.

Even as the target yaw rate is adjusted, a degree of the adjustment amount of the braking unit of the first control unit 310 may be adjusted to some extent.

For example, even when the current yaw rate of the vehicle is the same, as the target yaw rate increases, the difference between the target yaw rate and the current yaw rate, that is, a yaw error value, increases.

The first control unit 310 may adjust the adjustment amount of the braking unit to be greater, separately from adjusting the target yaw rate.

Referring to FIGS. 5A and 5B, even when the target yaw rate and the current yaw rate are the same, the first control unit 310 may adjust to generate a greater adjustment amount of the braking unit, when the stability control level is closer to the maximum level (Lmax).

Thereby, a difference in driving feeling according to the stability control level input by a driver may be further differentiated.

Here, FIG. 5A may be a case in which the stability control level is set to be lower than in FIG. 5B. FIG. 5A may illustrate a situation in which a difference between a target yaw rate (Yt1) and a current yaw rate (Yc) of the vehicle occurs, and FIG. 5B may illustrate a situation in which a situation in which a difference between a target yaw rate (Yt2) and a current yaw rate (Yc) of the vehicle occurs. Referring to FIGS. 5A and 5B, even in different driving situations, the difference between the target yaw rate and the current yaw rate may be the same.

In this case, the adjustment amount of the braking unit of FIG. 5A in which the stability control level is set to be low may be set to be lower than the adjustment amount of the braking unit of FIG. 5B.

In other words, the first control unit 310 may adjust a time at which yaw rate control is intervened by adjusting the size of the target yaw rate. More specifically, the first control unit 310 may set the target yaw rate to be larger as the stability control level increases, to set the time at which yaw rate control to be faster.

In addition, the first control unit 310 may adjust the degree of the adjustment amount of the braking unit according to a size of the yaw error determined by the difference between the target yaw rate and the current yaw rate. More specifically, the first control unit 310 may set the adjustment amount of the braking unit of yaw rate to be greater as the stability control level increases.

The first control unit 310 may allow the driver to more clearly feel the difference according to the stability control level by adjusting the degree of the adjustment amount of the braking unit according to the target yaw rate and yaw error value.

Referring again to FIG. 3, the stability control unit 300 may include a second control unit 320, and the second control unit 320 may perform slip control (S632).

The second control unit 320 may receive wheel slip information from the receiving unit 200, to control the driving unit 500.

Understeer may be a state in which the vehicle deviates from a target path according to vehicle driving speed and steering angle, and the vehicle is driven with a curvature of an actual path greater than that of the target path.

Since understeer occurs in a saturated state in which frictional force acting on front wheels is saturated outside a frictional source, to deviate from the under steer state, it may be necessary to drive the vehicle by transferring a portion of the driving force of the front wheels to the rear wheels.

Oversteer may be a state in which the vehicle deviates from a target path according to vehicle driving speed and steering angle, and the vehicle is driven with a curvature of an actual path smaller than that of the target path.

Since oversteer occurs in a saturated state in which frictional force acting on rear wheels is outside a frictional source, to deviate from the over steer state, it may be necessary to drive the vehicle by transferring a portion of the driving force of the rear wheels to the front wheels.

The second control unit 320 may adjust a target wheel slip.

Here, the target wheel slip may be a target value of wheel slip, and slip control may be performed depending on whether the difference between the current wheel slip and the target wheel slip exceeds wheel slip allowance.

Figure 6:
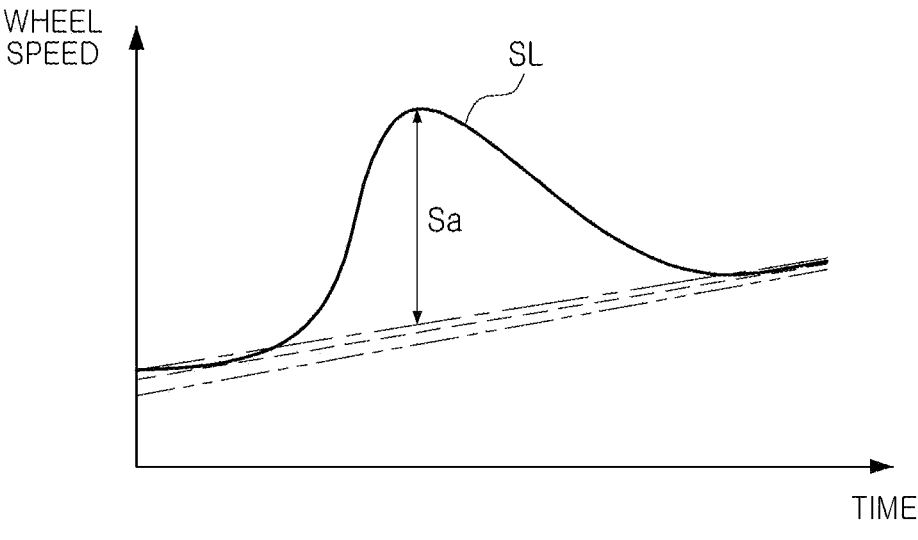
FIG. 6 is a diagram illustrating excessive wheel slip occurring in one wheel according to an embodiment of the present disclosure.

FIG. 6 is a diagram illustrating that excessive wheel slip has occurred in one wheel according to an embodiment of the present disclosure.

Referring to FIG. 6, a wheel speed of one wheel of a vehicle may be abnormally high (SL). Here, it can be seen that excessive wheel slip has occurred as much as a difference (Sa) between a speed of the other wheel and a wheel speed of a wheel in which excessive wheel slip has occurred.

Figure 7:
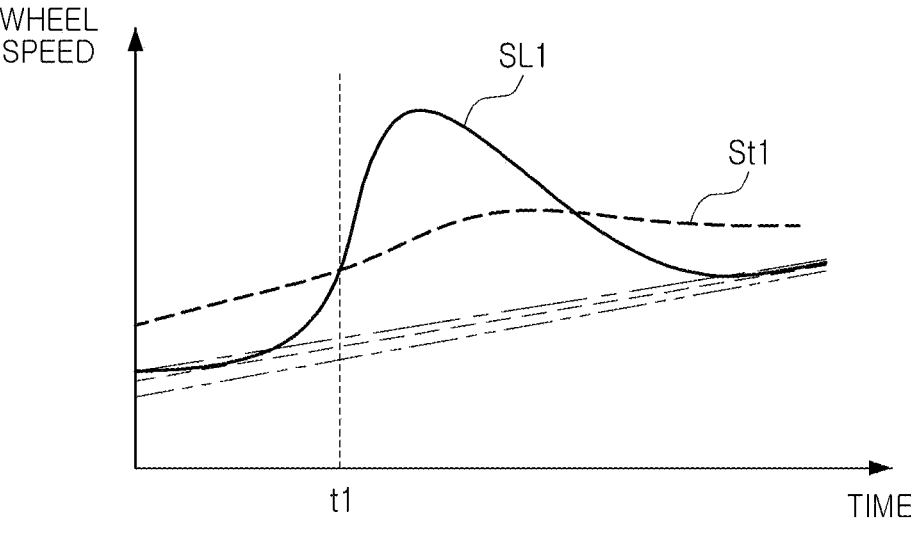
FIG. 7 is a diagram illustrating a wheel slip control initiation point according to an embodiment of the present disclosure.
Figure 8:
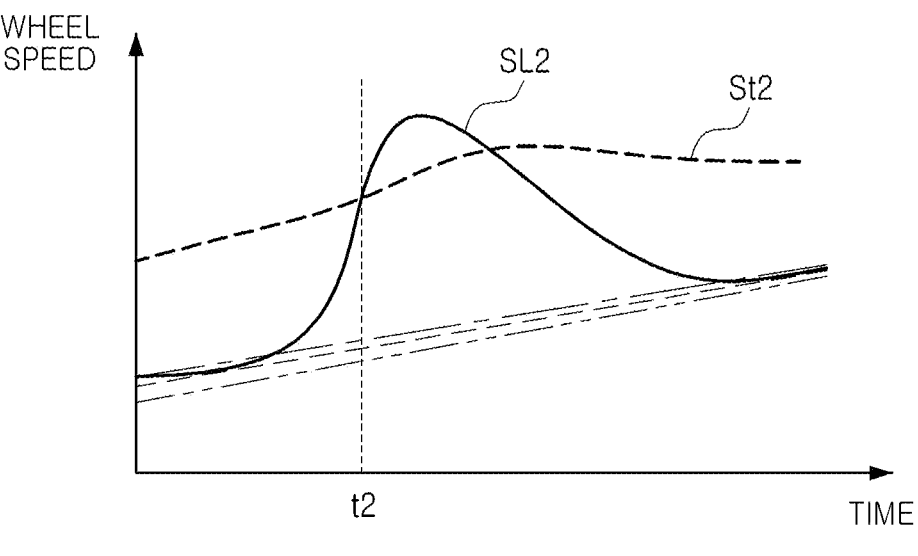
FIG. 8 is a diagram illustrating a wheel slip control initiation point according to another embodiment of the present disclosure.

FIG. 7 is a diagram exemplarily illustrating a wheel slip control initiation point according to an embodiment of the present disclosure, and FIG. 8 is a diagram exemplarily illustrating a wheel slip control initiation point according to another embodiment of the present disclosure.

A target wheel slip diagram (St1) in FIG. 7 may be a diagram regarding a target wheel slip when a stability control level is a maximum level (Lmax), and a target wheel slip diagram (St2) in FIG. 8 may be a diagram regarding a target wheel slip when the stability control level is a minimum level (Lmin).

Referring to FIGS. 7 and 8, when a wheel speed of a specific wheel exceeds a target wheel slip speed, the second control unit 320 may determine to initiate wheel slip control.

More specifically, in the case of FIG. 7, the second control unit 320 may initiate wheel slip control at a time (t1) when a wheel speed (SL1) of a specific wheel exceeds a target wheel slip speed (St1).

In addition, in the case of FIG. 8, the second control unit 320 may initiate wheel slip control at a time (t2) when a wheel speed (SL2) of a specific wheel exceeds a target wheel slip speed (St2).

Therefore, a wheel slip intervention initiation time (t1) when the stability control level is a maximum level (Lmax)

(see FIG. 7) may be faster than a wheel slip intervention initiation time (t2) when the stability control level is a minimum level (Lmin) (see FIG. 8).

In other words, as the stability control level increases, the second control unit 320 may be set a degree of a target wheel slip diagram to be lower, and wheel slip control may be initiated faster.

Figure 9:
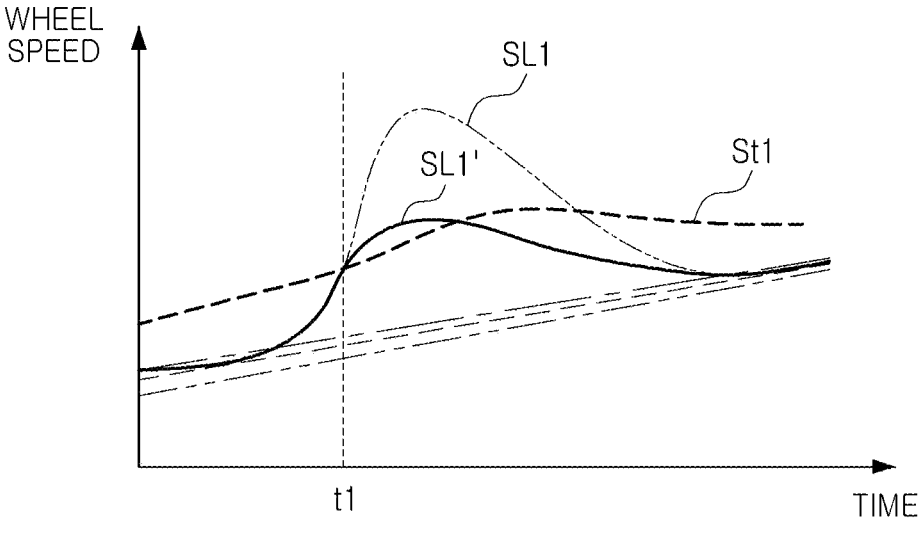
FIG. 9 is a diagram illustrating wheel slip control according to an embodiment of the present disclosure.
Figure 10:
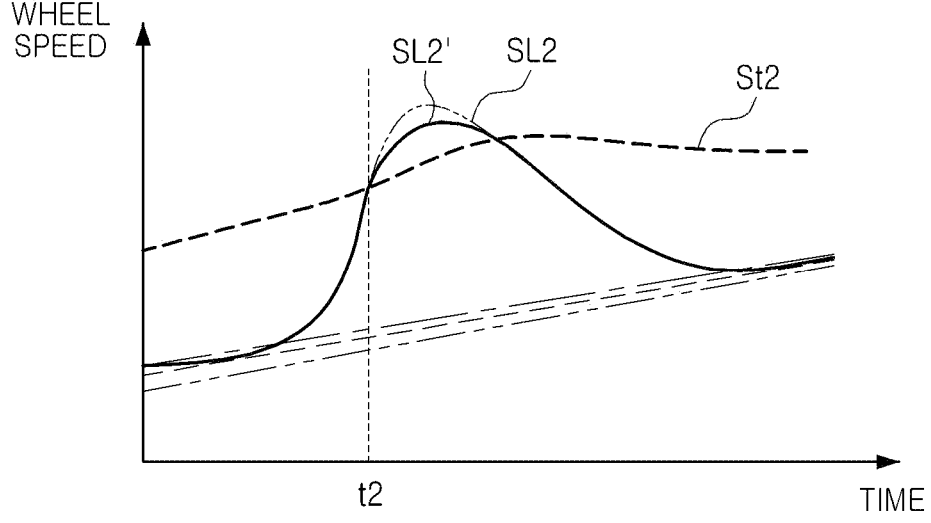
FIG. 10 is a diagram illustrating wheel slip control according to an embodiment of the present disclosure.

FIG. 9 is a diagram illustrating wheel slip control according to an embodiment of the present disclosure, and FIG. 10 is a diagram illustrating wheel slip control according to an embodiment of the present disclosure.

The second control unit 320 may adjust a size of a wheel slip control amount.

The second control unit 320 may increase the wheel slip control amount as the stability control level increases, and may adjust wheel slip exceeding a target wheel slip to fall below the target wheel slip more quickly.

When the stability control level is a maximum level (Lmax) (see FIG. 9), when wheel slip exceeds the target wheel slip, the wheel slip control amount may be increased to reduce wheel slip more quickly (see SL1').

When the stability control level is a maximum level (Lmin) (see FIG. 10), when wheel slip exceeds the target wheel slip, the wheel slip control amount may be set relatively small to reduce wheel slip more slowly than when the stability control level is high (see 'SL1').

Based on the input stability control level, the stability control unit 300 may adjust yaw rate control using the first control unit 310, and perform slip control using the second control unit 320, thereby allowing a driver to more clearly experience a difference in driving feeling depending on the stability control level.

Referring again to FIG. 3, the stability control unit 300 may determine whether a stability control end signal of a vehicle selected by the driver is received (S640).

Until the stability control end signal of a vehicle is received, the stability control unit 300 may perform stability control based on a stability control level selected by the driver (S620, S630).

When the stability control end signal of a vehicle is received, the vehicle may be driven in a basic driving mode set in the vehicle without control of the stability control unit 300 (S650).

The methods according to the present invention may be implemented in a form of program instructions that can be executed by various computer devices and recorded on a computer readable medium. The computer readable medium may include program instructions, data files, data structures, or the like, alone or in combination thereof. Program instructions recorded on a computer readable medium may be specially designed and configured for the present invention, or may be known and usable to those skilled in the art of computer software.

Examples of computer readable media include hardware devices specially configured to store and execute program instructions, such as ROM, RAM, flash memory, and the like. Examples of program instructions include high-level language codes that can be executed by a computer using an interpreter, or the like as well as machine language codes such as those produced by a compiler. The hardware device described above may be configured to operate with at least one software module to perform the operations of the present invention, and vice versa.

As set forth above, according to an embodiment of the present disclosure, in a vehicle stability control device and control method, vehicle stability may be controlled by adjusting an amount of change in stability control according to a stability control level set by a user while ensuring driving stability of the vehicle.

The aforementioned description merely illustrates the technical concept of the present disclosure, and a person skilled in the art to which the present invention pertains may make various modifications and modifications without departing from the essential characteristics of the present disclosure.

Therefore, the example embodiments disclosed in this specification and drawings are not intended to limit but to explain the technical concept of the present disclosure, and the scope of the technical idea of the present disclosure is not limited by these example embodiments. The scope of protection of the present disclosure should be interpreted by the following claims, and all technical ideas within the scope equivalent thereto should be interpreted as being included in the scope of the present disclosure.

What is claimed is:

1. A vehicle stability control device comprising:
an input unit;
a receiving unit; and
a stability control unit configured to control a driving force and a braking force based on a stability control level received from the input unit and driving information received from the receiving unit,
wherein the driving information comprises yaw rate information, and
wherein the stability control unit is further configured to:
control the braking force when the yaw rate information exceeds a target yaw rate; and
set the target yaw rate to be greater as the stability control level increases.

2. The vehicle stability control device of claim 1, wherein the stability control unit is configured to adjust a degree of the braking force according to a size of a yaw error, the yaw error being determined by a difference between the yaw rate information and the target yaw rate.

3. The vehicle stability control device of claim 1, wherein the driving information comprises wheel slip information, and the stability control unit is configured to control the driving force based on the wheel slip information.

4. The vehicle stability control device of claim 3, wherein the stability control unit is configured to control the driving force when the wheel slip information exceeds a target wheel slip.

5. The vehicle stability control device of claim 3, wherein the stability control unit is configured to adjust the driving force according to a difference between the wheel slip information and a target wheel slip.

6. A method of operating a vehicle, the method comprising:
receiving a stability control initiation signal;
receiving stability control setting information and driving information; and
in response to the stability control initiation signal, performing stability control by controlling a driving force and a braking force based on the driving information, the driving force and the braking force being adjusted according to the stability control setting information,
wherein the stability control setting information comprises information related to a stability control level,
wherein the driving information includes yaw rate information and wheel slip information,
wherein performing the stability control comprises controlling the driving force and the braking force using at least one of the yaw rate information and the wheel slip information, wherein performing the stability control further comprises controlling the braking force when the yaw rate information exceeds a target yaw rate, and wherein the target yaw rate is set to be higher as the stability control level increases.

7. The method of claim 6, wherein performing the stability control comprises setting a degree of the braking force according to a size of a yaw error, the yaw error being determined by a difference between the yaw rate information and the target yaw rate.

8. The method of claim 6, wherein performing the stability control comprises adjusting a degree of the braking force according to a size of a yaw error, the yaw error being determined by a difference between the yaw rate information and the target yaw rate.

9. The method of claim 6, wherein performing the stability control comprises controlling the driving force when the wheel slip information exceeds a target wheel slip, the target wheel slip being set to be smaller as the stability control level increases.

10. The method of claim 9, wherein performing the stability control comprises adjusting a degree of the driving force according to a difference between the wheel slip information and the target wheel slip.

11. The method of claim 9, wherein performing the stability control comprises setting a degree of the driving force to be greater according to a difference between the wheel slip information and the target wheel slip as the stability control level increases.

12. A vehicle stability control device comprising:

an input unit;

a receiving unit; and a stability control unit configured to control a driving force and a braking force based on a stability control level received from the input unit and driving information received from the receiving unit, wherein the driving information comprises yaw rate information, wherein the stability control unit is further configured to:

control the braking force based on the yaw rate information;

adjust a degree of the braking force according to a size of a yaw error, the yaw error being determined by a difference between the yaw rate information and a target yaw rate; and set the degree of the braking force according to the size of the yaw error to be greater as the stability control level increases.

13. The vehicle stability control device of claim 12, wherein the driving information comprises wheel slip information, and wherein the stability control unit is configured to control the driving force based on the wheel slip information.

14. The vehicle stability control device of claim 13, wherein the stability control unit is configured to control the driving force when the wheel slip information exceeds a target wheel slip.

15. The vehicle stability control device of claim 13, wherein the stability control unit is configured to adjust the driving force according to a difference between the wheel slip information and a target wheel slip.

16. A vehicle stability control device comprising:

an input unit;

a receiving unit; and a stability control unit configured to control a driving force and a braking force based on a stability control level received from the input unit and driving information received from the receiving unit, wherein the driving information comprises wheel slip information, and wherein the stability control unit is further configured to:

control the driving force when the wheel slip information exceeds a target wheel slip; and set the target wheel slip to be smaller as the stability control level increases.

17. A vehicle stability control device comprising:

an input unit;

a receiving unit; and a stability control unit configured to control a driving force and a braking force based on a stability control level received from the input unit and driving information received from the receiving unit, wherein the driving information comprises wheel slip information, and wherein the stability control unit is further configured to:

control the driving force based on the wheel slip information;

adjust the driving force according to a difference between the wheel slip information and a target wheel slip; and set the driving force to be greater according to the difference between the wheel slip information and the target wheel slip as the stability control level increases.

18. A method of operating a vehicle, the method comprising:

receiving a stability control initiation signal;

receiving stability control setting information and driving information; and in response to the stability control initiation signal, performing stability control by controlling a driving force and a braking force based on the driving information, the driving force and the braking force being adjusted according to the stability control setting information, wherein the stability control setting information comprises information related to a stability control level, wherein the driving information includes yaw rate information and wheel slip information, wherein performing the stability control comprises controlling the driving force and the braking force using at least one of the yaw rate information and the wheel slip information, and wherein performing the stability control comprises controlling the driving force when the wheel slip information exceeds a target wheel slip, the target wheel slip being set to be smaller as the stability control level increases.

19. The method of claim 18, wherein performing the stability control comprises adjusting a degree of the driving force according to a difference between the wheel slip information and the target wheel slip.

20. The method of claim 18, wherein performing the stability control comprises setting a degree of the driving force to be greater according to a difference between the wheel slip information and the target wheel slip as the stability control level increases.

* * * * *